United States Patent [19]

Lowcock et al.

[11] Patent Number: 5,194,947

[45] Date of Patent: Mar. 16, 1993

[54] APPARATUS FOR TAPPING CATV SIGNALS FROM A CABLE AND FOR CONTROLLING THE DISTRIBUTION

[75] Inventors: Roy L. Lowcock, Orangeville; Thomas H. Williams, Doraville, both of Ga.

[73] Assignee: Scientific-Atlanta, Inc., Norcross, Ga.

[21] Appl. No.: 521,220

[22] Filed: May 7, 1990

[51] Int. Cl.⁵ .................. H04N 7/10; H04L 17/02
[52] U.S. Cl. .................. 358/86; 455/4.2; 455/6.2; 380/10; 380/52
[58] Field of Search .................. 455/3-6, 455/26.1, 3.1, 4.1, 4.2, 5.1, 6.1, 6.2; 358/86, 349; 380/52, 10; 333/126

[56] References Cited

U.S. PATENT DOCUMENTS

| | | | |
|---|---|---|---|
| 4,135,157 | 1/1979 | den Toonder | 358/86 |
| 4,578,702 | 3/1986 | Campbell | 358/86 |
| 4,641,363 | 2/1987 | Hasegawa | 358/86 |
| 4,963,966 | 10/1990 | Harney et al. | 380/52 |

OTHER PUBLICATIONS

"Off-Premises Addressable System-Interdiction Through Jamming" Scientific Atlanta, Inc., Aug. 1989, John Cochran.

Primary Examiner—Reinhard J. Eisenzopf
Assistant Examiner—Andrew Faile
Attorney, Agent, or Firm—William A. Marvin; Frederick W. Powers, III

[57] ABSTRACT

In order to facilitate the installation of off-premises equipment which distributes CATV signals from a distribution cable to subscribers and to allow different subscribers to receive different classes of service (basic service alone or with one or more premium or pay-per-view channels), a pair of housings are used, one containing circuits for tapping the signals from the cable and the other for electronics hardware which processes the signals and distributes them to subscribers in accordance with the class of service which is ordered by the subscribers. The housing containing the tapping circuits is permanently connected to the cable and need not be removed or replaced when connecting additional subscribers or changing the class of service. The housing containing the electronics hardware for processing the signals may be attached to or along side of the first housing. The first housing may be suspended from the strand which supports the cable in an aerial mount configuration. The second housing may be attached to and suspended from the first housing. The first housing is smaller than the second housing so that the assembled housings constitute a body having a conning tower provided by the first housing.

9 Claims, 5 Drawing Sheets

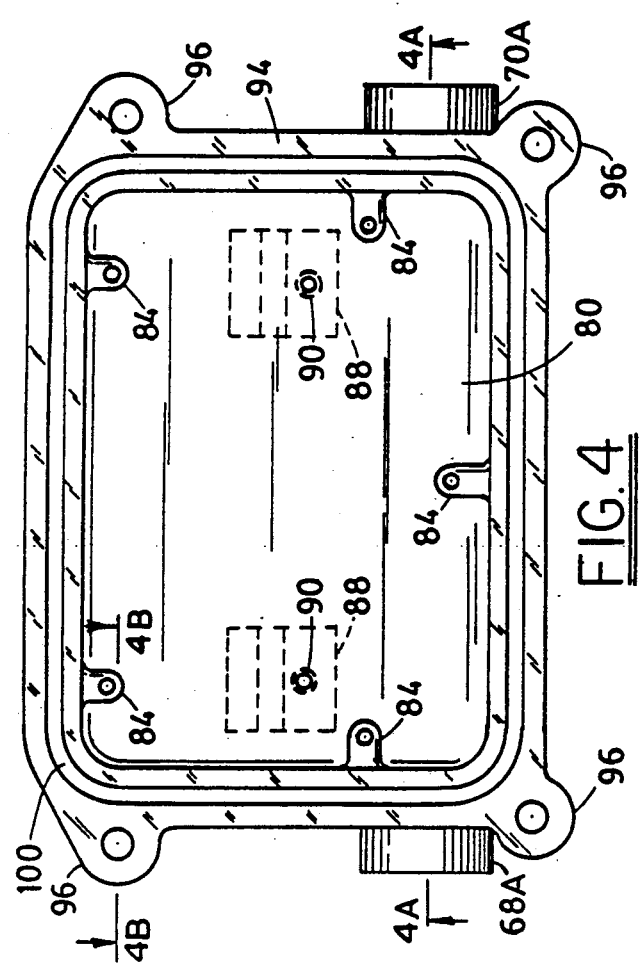
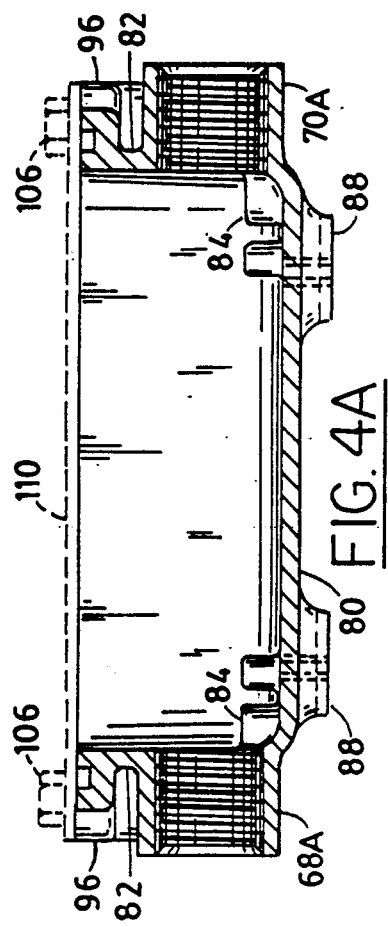
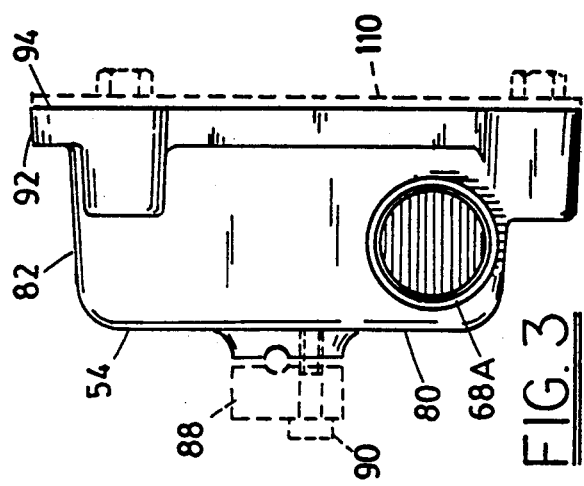
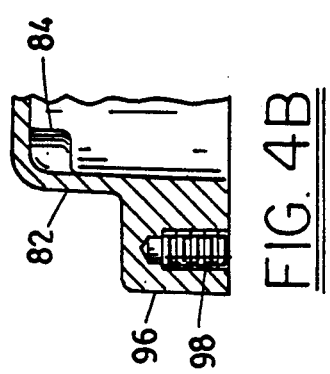

APPARATUS FOR TAPPING CATV SIGNALS FROM A CABLE AND FOR CONTROLLING THE DISTRIBUTION

The present invention relates to CATV signal distribution apparatus, and particularly to off-premises equipment which tap and process signals from the cable before delivery of the signals to television sets in the subscribers' premises.

The invention is especially suitable for use in off-premises systems which deliver different classes of service (basic service or basic service plus premium and pay-per-view channels) by interdiction of channels which are not ordered by subscribers. In such systems, the interdiction electronics hardware constitutes the majority of the off-premises equipment and is far more expensive than tapping devices which are located along the cable in the vicinity of subscribers' premises. It is therefore desirable to install off-premises signal processing equipment, only and particularly interdiction equipment, as and where required and to facilitate the installation or removal of such equipment. More particularly, it is desirable to install the equipment without the need for reworking the main distribution cable by cutting it, changing its length, installing connectors and rerouting the cable. Such reworking is particularly difficult because the cable is large in diameter and is very stiff. It is also desirable to facilitate changes in the off-premises equipment, for example going back to conventional distribution devices as may use on-premises convertors. In other words, it is desirable to provide off-premises equipment which can function as a conventional tapping device as well as with processing equipment capable of providing different classes of service, such as use interdiction technology.

Further information as to off-premises equipment capable of distributing and processing signals for providing selected classes of service and to signal processing equipment operative by interdiction through the use of jamming signals may be had from U.S. patent application Ser. No. 07/445,316 filed Dec. 4, 1989 now U.S. Pat. No. 4,963,966 in the names of Michael Harney et al., and assigned to the same assignee as this application. The system is also described in an application note, published in 1989 by Scientific Atlanta Inc., August 1989 by John Cochran and entitled "Off-Premises Addressable System - Interdiction Through Jamming". Reference may also be had to U.S. Pat. No. 4,578,702 issued Mar. 25, 1986 for further information respecting tapping devices used in CATV distribution systems.

Accordingly, it is the principal object of the present invention to provide improved off-premises equipment useful in CATV (cable antenna television) signal distribution networks.

It is a further object of the invention to provide improved CATV signal distribution apparatus which facilitates the installation or removal of off-premises signal processing equipment such as off-premises subscriber control units which enable different classes of CATV service to be provided to subscribers and also facilitate removal of such control units, whenever it is desired to use other equipment for providing service to subscribers such as conventional set-top converters.

Briefly described, the invention as embodied in a CATV signal distribution system using a cable to distribute the signals to subscribers, the signals being generated at the head end of the distribution network by the cable operator, utilizes apparatus for tapping the signals from the cable and for processing the signals to selectively control the distribution thereof to different subscribers, thereby enabling the subscribers to order different classes of service. The inventive apparatus makes use of a first housing and a second housing, both of which are adapted to be located off the subscribers' premises and adjacent to the cable and supported with the cable by a strand in aerial mount configuration. In such configuration, the strand is carried on poles and the cable is suspended from the strand. The first housing contains circuitry connected to the cable for tapping signals from the cable. The second housing contains circuitry for selectively controlling the distribution of the signals to the subscribers. The second housing has connectors for feed cables extending to the premises of the subscribers. The first housings are permanently mounted at locations along the cable. The cable has ends which are connected to terminals extending from the first housing so that the TV signals pass through the housing, while being tapped from the cable in the housing by the tapping circuitry therein. The second housing is mounted adjacent to the first housing. In one configuration, the first housing is much smaller than the second housing and is attached to the strand on the top side thereof. The first housing is also attached to the second housing and suspends the second housing from the bottom thereof. The circuitry in the first and second housings are interconnected so that the signals tapped from the cable are applied to the circuitry in the second housing for processing. In another configuration, the second housing is suspended from the strand. A plate closes the bottom of the first housing. The terminals in the plate and in the second housing are interconnected by a second cable which carries the signals tapped from the main cable by the tapping circuitry in the first housing to the second housing for processing therein.

The foregoing and other objects, features and advantages of the invention as well as the presently preferred embodiments thereof will become more apparent from a reading of the following description in connection with the accompanying drawings in which:

FIG. 3 is an end view of the first housing of an off-premises subscriber control unit which is adapted to contain tapping circuitry;

FIG. 4 is a bottom view of the housing shown in FIG. 3;

Figure 6:
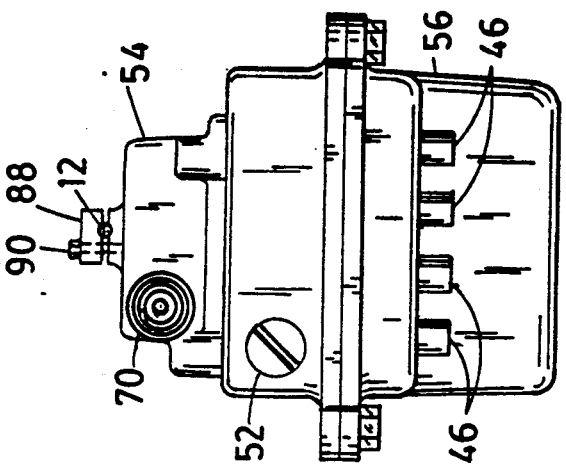
Figure 5:
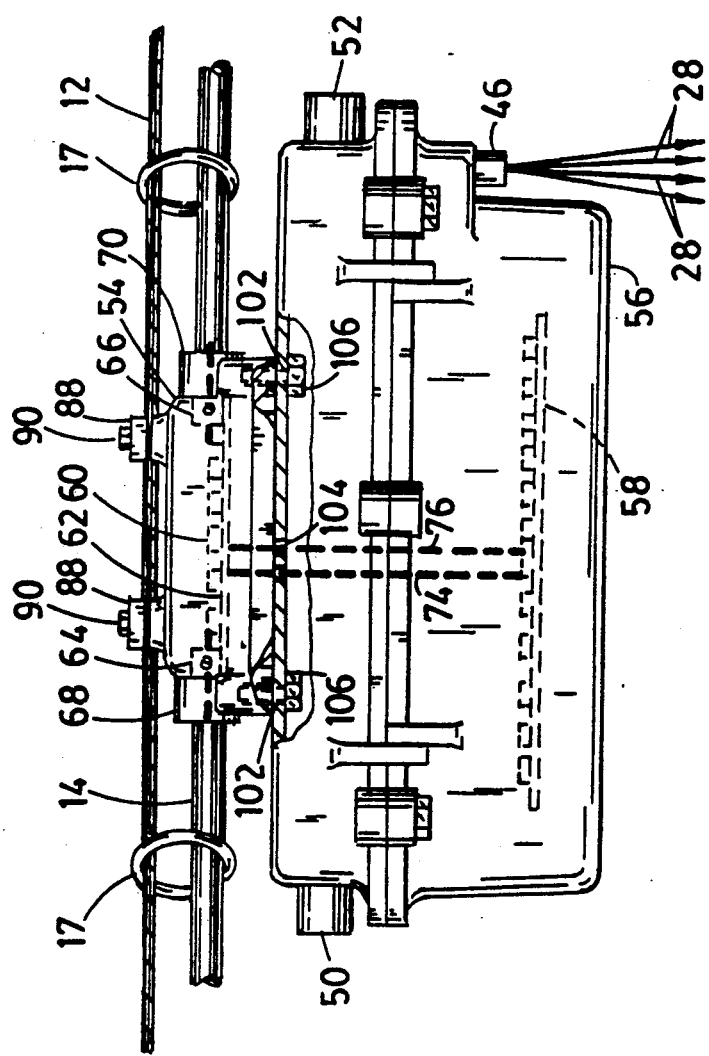
Figure 7:
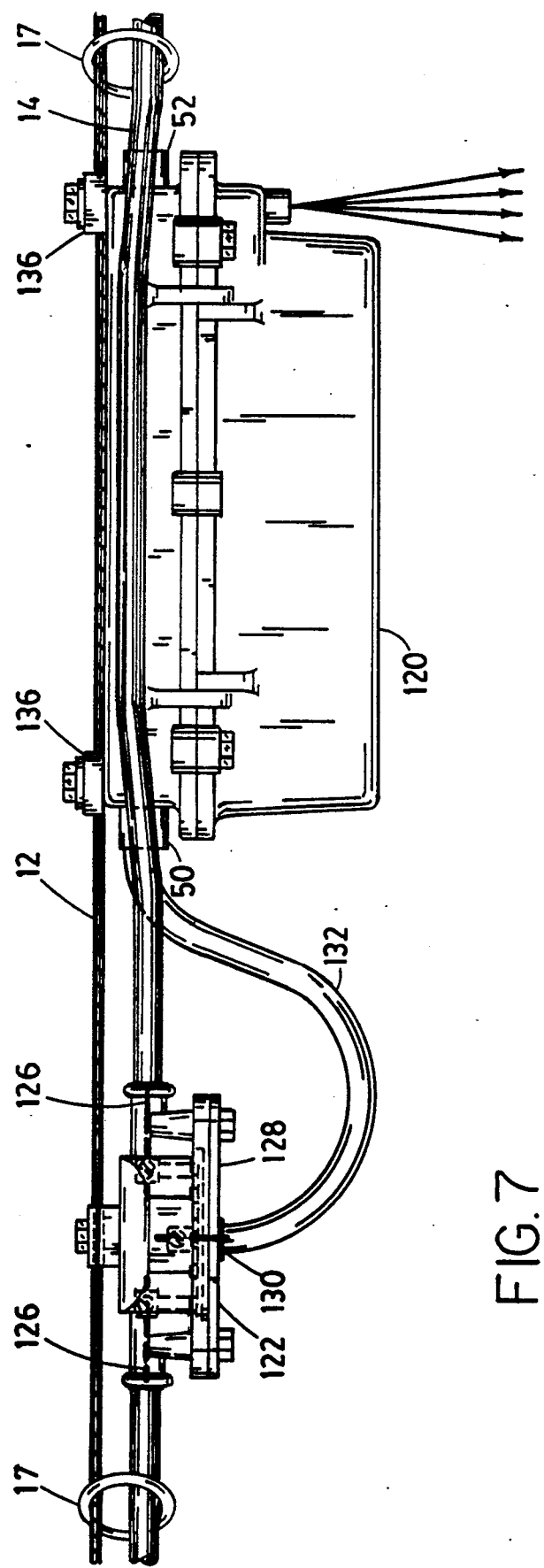
Figure 8:
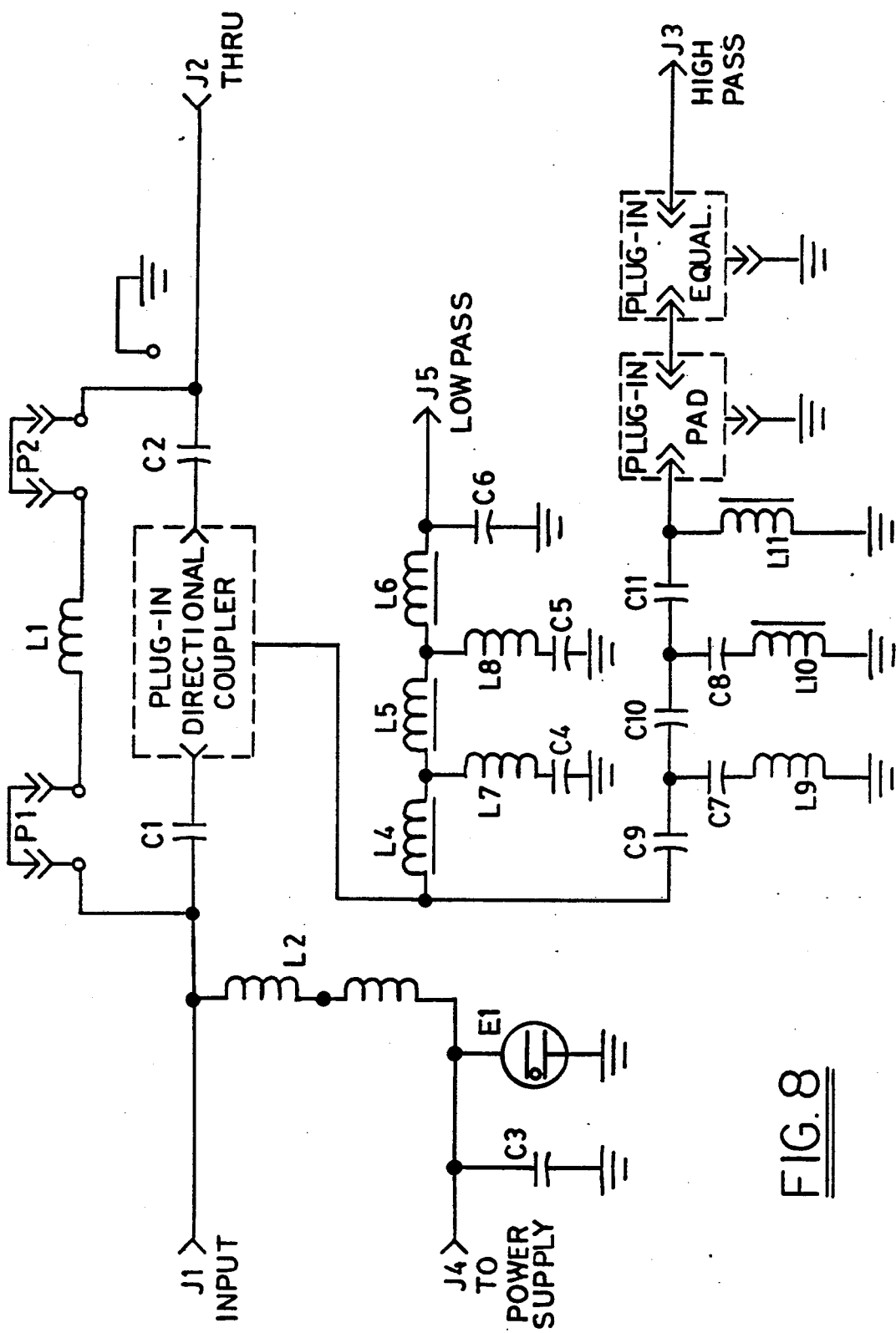

FIGS. 4A and B are sectional views respectively taken along the lines 4A—4A and 4B—4B in FIG. 4;

FIG. 5 is an elevational view of the off-premises equipment including the first housing and its tapping circuitry and a second housing containing subscriber control unit (signal processing) circuitry assembled in a conning tower configuration;

FIG. 6 is an end view of FIG. 5;

FIG. 7 is an elevational view of the first housing and the second housing which respectively contain the tapping circuitry and the subscriber control or signal processing circuitry disposed side by side in aerial mount configuration; and FIG. 8 is a schematic diagram of the tapping circuitry contained in the first housing.

Figure 1:
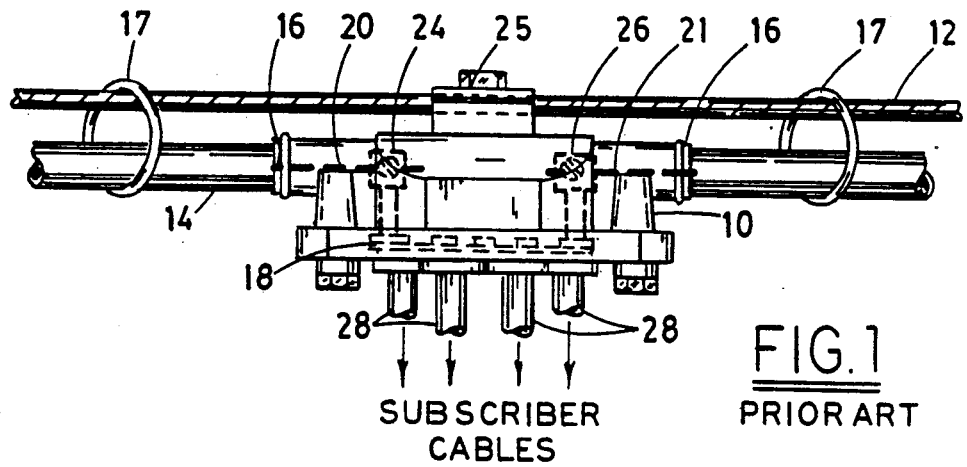
FIG. 1 is an elevational view of a conventional tapping device in aerial mount configuration.

Referring first to FIG. 1, there is shown a prior art tapping device 10 which is mounted on a strand 12. The strand 12 may be strung between poles in a typical aerial mount configuration. The cable 14 which distributes the CATV signals may either be the main cable or a feeder cable connected to the head end. It is suspended from the strand 12 on hangers as shown at 17 or with lashing. The tapping device 10 is connected across a gap in the cable. The cable is a coaxial cable which is connected to connectors 16 at opposing ends on opposite sides of the gap in the cable. These connectors extend from the housing of the tapping device 10. A clamp 25 on the top of the housing of the device attaches the device to the strand 12. The tapping device has a printed circuit board 18 contained therein to which the center conductors 20 and 21 of the cable 14 are connected via seizure posts 24 and 26 which extend from the board. The tapping circuitry 18 distributes the CATV signals to subscribers in the location of the tapping device 10 by way of drop cables (subscriber cables) 28. Tapping devices as shown in FIG. 1 are adapted for use in conventional CATV distribution systems where set top converters are used on the subscribers' premises for processing the CATV signals to obtain the level of service which is ordered by the subscriber from the cable operator.

Figure 2:
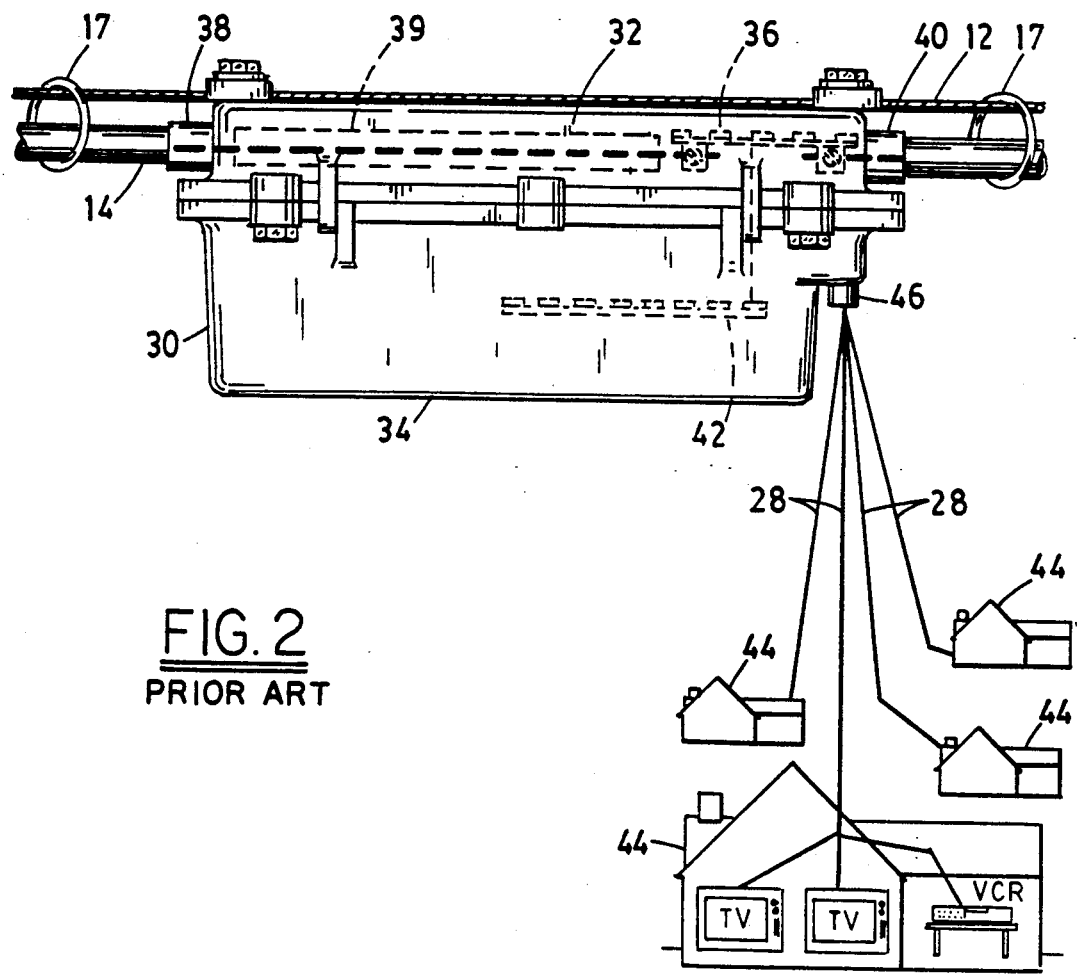
FIG. 2 is an elevational view of a off-premises subscriber control unit of the type described in the above-identified patent application which is filed in the name of Michael Harney et al., and in the paper by John Cochran, such off-premises subscriber control unit being available from Scientific Atlanta, Inc., 4311 Communications Drive, Atlanta, Ga. 33048.

FIG. 2 shows the off-premises equipment of the type containing a subscriber control unit as described in the above-referenced article by John Cochran and in the Michael Harney, et al. patent application, also referenced above. An aerial mount configuration on a strand 12 is shown. The cable is suspended from the strand by lashing or hangers 17. The subscriber control unit 30 has a housing with a cover 32 and a base section 34. The cover 32 contains tapping circuitry on a board 36. A length of coaxial cable 38 extends from the board 36 to a connector 38 to which one end of the cable 14 is connected. The other end of the cable is separated from the end connected to the connector 38 by a much longer gap than used in the case of the tapping device 10 shown in FIG. 1. The opposite end of the cable is connected to a connector 40. The tapping circuitry 36 is connected to signal processing (interdiction) electronics schematically shown as a board 42 which is contained in the base section 34 of the unit 30. This board processes the signals in accordance with the level of service selected by subscribers in premises 44 via connectors 46 on the unit 30. The unit 30 is expensive and it is not desirable to install such a unit except in locations where subscribers are present and where the subscribers order various levels of service so that the interdiction electronics can provide the requisite level of service. Moreover, the use of the length of cable 38 provides at least one additional termination between the cable and the tapping electronics board 36. It is desirable to avoid such additional termination in order to improve the transmission performance of the CATV distribution system. It will also be apparent that removal of the unit 32 and replacing it with a conventional tap when the level of service at any location must be changed back to a lower level of service by installing a conventional tapping device, presents a difficult installation problem requiring removal of the original cable or replacing it with extra lengths of cable so as to accommodate the smaller tapping device. Moreover, any such installations require that service to subscribers down the cable be interrupted.

The present invention enables off-premises equipment having an off-premises unit to be installed or removed without difficulty. Off-premises control units can then be installed only as and where required to meet subscribers' needs. Two configurations of the off-premises system are shown; one in FIGS. 5 and 6 and the other in FIG. 7. Each of these configurations utilizes a standard subscriber control unit in which the tapping electronics in the cover section is removed. The connector ports 50 and 52 at the opposite ends of the units which normally receive the cable (see connectors 38 and 40 in FIG. 2) are plugged.

The first configuration is illustrated in FIGS. 3 to 6. The equipment as assembled is a body having a conning tower configuration. The conning tower is provided by a first housing 54. A second housing 56 containing the subscriber control unit electronics, illustrated schematically as a printed circuit board 58, is also part of the off-premises equipment. The housing 54 contains circuitry shown mounted on a circuit board 62. This circuitry provides the tapping electronics and may be of the type illustrated in FIG. 8. The circuitry has an input side at a seizure 64 (J1 in FIG. 8) and an output or through side to the downstream portion of the distribution network. This output side terminates at a seizure 66 (J2 in FIG. 8). The cable 14 has ends separated by a gap which are fastened in connectors 68 and 70 on the input and through ends on opposite side walls of the housing 54. The cable is suspended from a strand 12 and aerial mount configuration by hangers or lashing as shown at 17.

The tapping electronics is generally of the type described in the above-referenced Michael Harney, et al. patent application. It includes a plug-in directional coupler on the board 62 which is capacitively coupled by C1 and C2 to the input and through ends of the cable. A bridging inductor L1 for carrying power down the cable shunts C1, C2 and the directional coupler. A protective circuit L2, E1 and C3 is connected to one end of the cable. This protective circuit taps off power to supply electronics on circuit board 58. A similar protective circuit (not shown) is connected to the opposite or input end of the cable. In this protective circuit, E1 is a gas discharge tube. The coupler is connected to a low-pass filter in parallel with a high-pass filter. The low-pass filter L4–L8, C4–C6 enables signals from the subscriber to be fed back to the head end via the cable. The high-pass filter (C7–C11 and L9–L11) is connected to an adjusting pad and equalizer and carries the TV signals tapped from the cable to the subscribers. There are two lines from J3 and J5 illustrated in FIG. 6 at 74 and 76 which connect the tapping circuitry on the board 60 to the signal processing circuitry. The signal processing circuitry has in this embodiment four outputs at four connectors 46 (as was the case in FIG. 2) which are connected to the subscribers' premises via drop cables 28.

Both the housing 54 and the subscriber control unit housing 56 are generally in the shape of rectangular parallelepipeds. The design of the housing 54 is shown in FIGS. 3, 4, 4A and 4B. In these FIGS., the circuit board 60 is removed. The housing is generally of cup-shaped configuration and has a top 80 and side walls 82. Opposite ones of these walls contain threaded holes 68A and 70A which receive the connectors attached to the opposite ends of the cable. The printed circuit board 60 is mounted on posts 84. These posts have threaded holes for receiving screws (not shown) which attach the board 60 so it is spaced from the top 80 and so that the seizures thereon receive the center conductors of the cable 14 as shown in FIG. 5. The outside of the top has attached thereto clamps 88. These clamps attach the housing to the strand 12 as shown in FIGS. 5 and 6. The clamps are tightened by bolts 90 which extend to holes, which may be partially threaded in the jaws of the clamps 88.

The housing has a bottom 92 with a bottom surface 94. This bottom surface is in the form of a flange with ears 96. The ears have threaded holes 98. The bottom surface also has a groove 100 therein which contains an O-ring seal.

In the conning tower assembly shown in FIGS. 5 and 6, the cover of the housing has four holes 102 and a hole 104 which is in alignment with the open bottom 92 of the first housing 54. The leads 74 and 76 extend through these aligned holes to the signal processing electronics as shown in FIG. 5. Bolts 106 extend through the holes 102 in the top of the cover of the second housing 56 past the bottom surface of the housing and attach the second, subscriber unit housing 56 to the bottom of the first housing 54. The first housing is supported on and suspended from the strand 12.

The second housing 56 is attached via the connector elements provided by the bolts 106 and threaded holes 98 from the first housing thereby providing the conning tower assembly. It will be appreciated that if the subscriber control unit off-premises equipment is not necessary, all that needs to be done is to attach a plate 110 across the open bottom 92 of the first housing 54 to seal the unit. The O-ring seal provides a sealed enclosure whether the first housing is closed by the top of the cover of the second housing 56 or with the plate 110.

Referring to FIG. 7, there is shown another aerial mount configuration of a subscriber control unit 120 and a tapping unit 122, both suspended from a strand 12 which also suspends a cable 14 on hangers or lashing as shown at 17. The tapping unit 122 may either be a conventional tap wherein opposite ends of the cable across a gap therein are connected to connectors 126 on opposite sides of the enclosure or housing of the tapping device 122. The tapping device 122 may be a conventional tapping device or the device shown in FIGS. 3 to 6 (i.e., the first housing 54 with its tapping circuitry). A bottom plate 128 is provided with a connector 130 which receives an end of a second cable 132. This second cable is connected to lines from the circuitry in the tapping device 122. The subscriber control unit 120 has a connector 50 which receives the cable 132 and connects the lines therein to the electronics of the control unit 120.

The subscriber control unit housing or second housing is connected by clamps 136 to the strand and is suspended therefrom adjacent to and along side of the tapping device 122. The cable 14 extends along side and outside of the housing of the subscriber control unit 120, bypassing that unit as it proceeds in a downstream direction.

From the foregoing description it will be apparent that there has been provided improved off-premises equipment for use as CATV signal distribution apparatus. Variations and modifications in the herein-described equipment, within the scope of the invention, will undoubtedly suggest themselves to those skilled in the art. Accordingly, the foregoing description should be taken as illustrative and not in a limiting sense.

We claim:

1. An off-premises CATV signal distribution apparatus for a CATV signal distribution system which delivers CATV signals to subscribers from a cable, said CATV signal distribution apparatus for tapping signals from said cable, for processing said signals, and for selectively controlling the distribution of said signals to different subscribers, said apparatus comprising:

a first housing containing circuitry for tapping said CATV signals from said cable;

a second housing containing circuitry for processing and selectively controlling the distribution of said CATV signals to said subscribers, said second housing having connectors for feeder cables which extend to the premises of said subscribers;

means for permanently mounting said first housing at a location along said cable, said first housing having terminals connected to ends of said cable on opposite sides of a gap in said cable;

means for connecting said circuitry in said first housing to said circuitry in said second housing and for applying signals tapped from said cable by said circuitry in said first housing to said circuitry in said second housing;

wherein said second housing has a top portion and a bottom portion which are fastened together;

wherein said first housing has a top portion; and wherein the top portion of said first housing can be fastened to the top portion of said second housing so that a bottom portion of said first housing is constituted by said second housing.

2. The apparatus according to claim 1 wherein said first and second housings define volumes which are generally rectangular parallelepipeds in shape.

3. The apparatus according to claim 2 wherein said first housing defines a smaller volume than said second housing.

4. The apparatus according to claim 1 wherein a support strand rungs alongside said cable, further including:

hangers on said support strand supporting said cable; and at least said first housing being attached to and suspended from said support strand at said location.

5. The apparatus according to claim 4 wherein said first housing top portion has a surface, said first housing top portion being at least in part open, connector elements extending from said top portion of said second housing past said surface into said first housing, said connector elements supporting said second housing aligned with said open part of said first housing, and said connecting means including at least one line extending through said open part and interconnecting said circuitry contained in said first and second housings.

6. The apparatus according to claim 5 wherein said top portion of said first housing is open and has an edge extending peripherally around said top portion of said first housing, said edge defining said surface of said top portion of said first housing, and a seal disposed between said surface and the top portion of said second housing.

7. The apparatus according to claim 6 wherein said edge has at least one flange having a plurality of threaded holes perpendicular to said surface, bolts extending through said top potion of said second housing into said holes, said bolts and threaded holes providing said connector elements, said first and second housings interconnected by said connector elements to define an assembly.

8. The apparatus according to claim 7 wherein said first housing has at least one clamp for clamping said assembly to said support strand thereby supporting said assembly.

9. The apparatus according to claim 8 wherein said first housing is smaller in width, height and length than said second housing is in width, height and length, such that said assembly is in the shape of a body having a conning tower.

* * * * *